United States Patent
Amin

(10) Patent No.: US 12,093,787 B2
(45) Date of Patent: Sep. 17, 2024

(54) SYSTEMS AND METHODS FOR IMPROVING THE PERFORMANCE OF NON-STOQUASTIC QUANTUM DEVICES

(71) Applicant: D-WAVE SYSTEMS INC., Burnaby (CA)

(72) Inventor: Mohammad H. Amin, Coquitlam (CA)

(73) Assignee: D-WAVE SYSTEMS INC., Burnaby (CA)

( * ) Notice: Subject to any disclaimer, the term of this patent is extended or adjusted under 35 U.S.C. 154(b) by 520 days.

(21) Appl. No.: 17/602,097

(22) PCT Filed: Apr. 9, 2020

(86) PCT No.: PCT/US2020/027532
§ 371 (c)(1),
(2) Date: Oct. 7, 2021

(87) PCT Pub. No.: WO2020/210536
PCT Pub. Date: Oct. 15, 2020

(65) Prior Publication Data
US 2022/0215282 A1   Jul. 7, 2022

Related U.S. Application Data

(60) Provisional application No. 62/832,117, filed on Apr. 10, 2019.

(51) Int. Cl.
*G06N 10/40* (2022.01)
*G06N 10/20* (2022.01)

(52) U.S. Cl.
CPC ............. *G06N 10/40* (2022.01); *G06N 10/20* (2022.01)

(58) Field of Classification Search
CPC ........ G06N 10/40; G06N 10/20; G06N 10/00; B82Y 10/00
See application file for complete search history.

(56) References Cited

U.S. PATENT DOCUMENTS

| | | | |
|---|---|---|---|
| 7,135,701 B2 | 11/2006 | Amin et al. | |
| 7,418,283 B2 | 8/2008 | Amin | |

(Continued)

FOREIGN PATENT DOCUMENTS

| | | |
|---|---|---|
| CN | 1498416 A | 5/2004 |
| CN | 101399425 A | 4/2009 |

(Continued)

OTHER PUBLICATIONS

Amin et al., Macroscopic Resonant Tunneling in the Presence of Low Frequency Noise, arXiv:0712.0845 [cond-mat.mes-hall], May 13, 2008, pp. 1-4.

(Continued)

*Primary Examiner* — Stacy Whitmore
(74) *Attorney, Agent, or Firm* — Cozen O'Connor

(57) ABSTRACT

A technique for improving the performance of non-stoquastic quantum processors is provided. Clusters of qubits with correlated behavior are identified in a problem for processing by the quantum processor. Couplings between qubits in a common cluster are modified according to a transformation (for example, a gauge transformation) so that they evolve slower and thus their dynamics freeze out later (for example, by flipping anti-ferromagnetic couplings to ferromagnetic couplings). Couplings between qubits that do not belong to the common cluster may be flipped the other way (for example, from ferromagnetic couplings to anti-ferromagnetic couplings) to accelerate their dynamics. The quantum processor is evolved and the results are modified according to an inverse transformation.

20 Claims, 3 Drawing Sheets

(56) References Cited

U.S. PATENT DOCUMENTS

| | | |
|---|---|---|
| 7,533,068 B2 | 5/2009 | Maassen et al. |
| 7,788,192 B2 | 8/2010 | Amin |
| 7,800,395 B2 | 9/2010 | Johnson et al. |
| 7,843,209 B2 | 11/2010 | Berkley |
| 7,876,248 B2 | 1/2011 | Berkley et al. |
| 7,898,282 B2 | 3/2011 | Harris et al. |
| 7,984,012 B2 | 7/2011 | Coury et al. |
| 8,008,942 B2 | 8/2011 | Van et al. |
| 8,035,540 B2 | 10/2011 | Berkley et al. |
| 8,098,179 B2 | 1/2012 | Bunyk et al. |
| 8,174,305 B2 | 5/2012 | Harris |
| 8,175,995 B2 | 5/2012 | Amin |
| 8,190,548 B2 | 5/2012 | Choi |
| 8,195,596 B2 | 6/2012 | Rose et al. |
| 8,229,863 B2 | 7/2012 | Amin et al. |
| 8,244,662 B2 | 8/2012 | Coury et al. |
| 8,421,053 B2 | 4/2013 | Bunyk et al. |
| 8,536,566 B2 | 9/2013 | Johansson et al. |
| 8,670,807 B2 | 3/2014 | Rose et al. |
| 8,700,689 B2 | 4/2014 | Macready et al. |
| 9,069,928 B2 | 6/2015 | Van Den Brink et al. |
| 9,218,567 B2 | 12/2015 | Macready et al. |
| 9,882,112 B2 | 1/2018 | Kwon et al. |
| 9,949,020 B1 | 4/2018 | Gedney et al. |
| 10,599,988 B2 | 3/2020 | Thom et al. |
| 11,157,817 B2 | 10/2021 | Rolfe |
| 11,295,225 B2 | 4/2022 | Hoskinson et al. |
| 2003/0141868 A1 | 7/2003 | Bakharev |
| 2005/0059138 A1 | 3/2005 | Vitaliano et al. |
| 2005/0119829 A1 | 6/2005 | Bishop et al. |
| 2006/0115145 A1 | 6/2006 | Bishop et al. |
| 2008/0103996 A1 | 5/2008 | Forman et al. |
| 2009/0078931 A1 | 3/2009 | Berkley |
| 2009/0121215 A1 | 5/2009 | Choi |
| 2009/0289638 A1 | 11/2009 | Farinelli et al. |
| 2010/0185422 A1 | 7/2010 | Hoversten |
| 2010/0228694 A1 | 9/2010 | Le et al. |
| 2011/0060780 A1 | 3/2011 | Berkley et al. |
| 2012/0319684 A1 | 12/2012 | Gambetta et al. |
| 2014/0040176 A1 | 2/2014 | Balakrishnan et al. |
| 2014/0214835 A1 | 7/2014 | Oehrle et al. |
| 2014/0297235 A1 | 10/2014 | Arora et al. |
| 2015/0009746 A1 | 1/2015 | Kucsko et al. |
| 2015/0032992 A1 | 1/2015 | Goettfert et al. |
| 2015/0032994 A1 | 1/2015 | Chudak et al. |
| 2015/0262073 A1 | 9/2015 | Lanting |
| 2015/0269124 A1 | 9/2015 | Hamze et al. |
| 2015/0324705 A1 | 11/2015 | Biercuk et al. |
| 2015/0363708 A1 | 12/2015 | Amin et al. |
| 2016/0042294 A1 | 2/2016 | Macready et al. |
| 2016/0071021 A1 | 3/2016 | Raymond |
| 2017/0017894 A1 | 1/2017 | Lanting et al. |
| 2018/0307988 A1 | 10/2018 | Fano et al. |
| 2018/0308007 A1 | 10/2018 | Amin et al. |
| 2018/0330264 A1 | 11/2018 | Lanting et al. |
| 2018/0341874 A1 | 11/2018 | Puri et al. |
| 2018/0365587 A1 | 12/2018 | Barzegar et al. |
| 2019/0266510 A1 | 8/2019 | Yarkoni et al. |
| 2021/0241143 A1 | 8/2021 | Amin |
| 2022/0215282 A1 | 7/2022 | Amin |

FOREIGN PATENT DOCUMENTS

| | | |
|---|---|---|
| CN | 104715806 A | 6/2015 |
| JP | 2012502563 A | 1/2012 |
| KR | 20170076473 A | 7/2017 |
| WO | 2005093649 A1 | 10/2005 |
| WO | 2007085074 A1 | 8/2007 |
| WO | 2012064974 A2 | 5/2012 |
| WO | 2013082382 A1 | 6/2013 |
| WO | 2016089711 A1 | 6/2016 |
| WO | 2016210018 A1 | 12/2016 |
| WO | 2017075246 A1 | 5/2017 |
| WO | 2018058061 A1 | 3/2018 |

OTHER PUBLICATIONS

Bunyk et al., "Architectural Considerations in the Design of a Superconducting Quantum Annealing Processor," IEEE Trans. Appl. Supercond., 24, arXiv:1401.5504v1 [quant-ph] Jan. 21, 2014, 9 pages.

Burton Jr. et al., "Event-Dependent Control of Noise Enhances Learning in Neural Networks," Neural Networks vol. 5, 1992, pp. 627-637.

Chinese Office Action for Application No. CN 2016800763698, dated Jun. 11, 2021, 26 pages (including English translation).

Clarke et al., "Quiet Readout of Superconducting Flux States," Physica Scripta. T102: 173-177, 2002.

Denchev et al., "What is the Computational Value of Finite Range Tunneling," arXiv:1512.02206 Jan. 22, 2016.

Dickson, N.G. et al., "Algorithmic Approach to Adiabatic Quantum Optimization," Physical Review A 85(032303), 7 pages, 2012.

Harris et al., "Probing Noise in Flux Qubits via Macroscopic Resonant Tunneling", arXiv:0712.0838v2 [cond-mat.mes-hall], Feb. 8, 2008, pp. 1-4.

Swersky, Multi-Task Bayesian Optimization, Advances in Neural Information Processing Systems 26, 2013, pp. 1-9.

Hendrik Bluhm et al., "Enhancing the Coherence of a Spin Qubit by Operating it as a Feedback Loop that Controls its Nuclear Spin Bath", Physical Review Letters, Nov. 19, 2010 (Year: 2010).

Kone et al., "Selection of Temperature Intervals for Parallel-tempering Simulations", The Journal of Chemical Physics Mar. 25, 2005. https://aip.scitation.org/doi/10.1063/1.1917749.

Kumar, P. et al., "Origin and Suppression of 1/f Magnetic Flux Noise," arXiv: 1604.00877v1 [cond-mat.supr-con] Apr. 4, 2016, 13 pages.

Snoek, et al., Practical Bayesian Optimization of Machine Learning Algorithms, arXiv:1206.2944v2 [stat.ML], Aug. 29, 2012, pp. 1-12.

Lanting, T. et al., "Experimental Demonstration of Perturbative Anticrossing Mitigation Using Nonuniform Driver Hamiltonians," Physical Review A 96(042322), 8 pages, 2017.

Li, Y. et al., "Hybrid Parallel Tempering and Simulated Annealing Method," Applied Mathematics and Computation, 212:216-228, 2009.

Ozfidan et al., "Demonstration of Nonstoquastic Hamiltonian in Coupled Superconducting Flux Qubits," arXiv:1903.06139 Nov. 8, 2019.

Ronnow et al., "Defining and Detecting Quantum Speedup," arXiv:1401.2910v1 Jan. 13, 2014.

S, Yu and Z. Xi, "The dynamics of a hybrid system based on the NV center in spin bath," 2015 34th Chinese Control Conference (CCC), 2015, pp. 8357-8361, doi: 10.1109/ChiCC.2015.7260967. (Year: 2015).

Sendelbach, S. et al., "Magnetism in SQUIDs at Millikelvin Temperatures," arXiv:0802.1518v1 [cond-mat.supr-con] Feb. 11, 2008, 4 pages.

Kurihara, et al. "Quantum Annealing for Clustering", arXiv:0905.3527v2 [cond-mat.dis-nn], May 28, 2009, pp. 1-9.

Boxio, et al., Computational Role of Multiqubit Tunneling in a Quantum Annealer, arXiv:1502.05754v1 [quant-ph], Feb. 20, 2015, pp. 1-7.

Brochu, et al., A Tutorial on Bayseian Optimization of Expensive Cost Functions, with Application to Active User Modeling and Hierarchical Reinforcement Learning, arXiv:1012.2599v1 [cs.LG], Dec. 12, 2010, pp. 1-49.

Rose, et al., "An Introduction to Quantum Annealing", DWAVE Technical Document 0712, Aug. 10, 2007, pp. 1-3.

Dickson, "Elimination of perturbative crossings in adiabatic quantum optimization", New Journal of Physics, 13, Jul. 11, 2011, 073011, 13pp.

Hutter, et al., "Sequential Model-Based Optimization for General Algorithm Configuration", Springer-Verlag Berlin Heidelberg, LION 5, LNCS 6683, 2011, pp. 507-523.

Ingber, Adaptive Simulated Annealing, ASA Options, Jan. 2012, pp. 1-22.

(56) References Cited

OTHER PUBLICATIONS

King, et al., "Degeneracy, degree, and heavy tails in quantum annealing" Physical Review a 93, (2016) pp. 052320-1 To 052320-12 (year:2016).

Maryak, et al., Efficient Global Optimization Using SPSA, Proceedings of the American Control Conference, San Diego, California, Jun. 1999, pp. 890-894.

Boixo, et al., "Experimental signature of programmable quantum annealing", arXiv:1212.1739v1 [quant-ph], Dec. 7, 2012, 12 pages.

Bluhm, et al., "Enhancing the Coherence of Spin Qubits by Narrowing the Nuclear Spin Bath Using a Quantum Feedback Loop", arXiv:1003.4031v1 [cond-mat.mes-hall] Mar. 21, 2010, 5 pages.

Kechedzhi, et al., "Efficient population transfer via non-ergodic extended states in quantum spin glass", arXiv:1807.04792v1 [quant-ph] Jul. 12, 2018, 16 pages.

King, et al., "Quantum critical dynamics in a 5000-qubit programmable spin glass", arXiv:2207.13800v1 [quant-ph] Jul. 27, 2022, 41 pages.

Mohseni, et al., "Engineering non-equilibrium quantum phase transitions via casually gapped Hamiltonians" arXix:1804.11037v2 [quant-ph] Oct. 19, 2018, 16 pages.

Preskill, "Quantum Computing in the NISQ era and beyond", arXiv:100862v3 [quant ph] Jul. 31, 2018, 20 pages.

Smelyanskiy, et al., "Non-ergodic delocalized states for efficient population transfer within a narrow band of the energy landscape", arXiv:1802.09542v2 [quant-ph] May 23, 2018, 48 pages.

Wang, et al., "Many-body localization enables iterative quantum optimization", arXiv:2111.00842v1 [quant-ph], Nov. 1, 2021, 7 pages.

International Search Report for PCT/US2020/027532, mailed Jul. 23, 2020, 3 pages.

Written Opinion for PCT/US2020/027532, mailed Jul. 23, 2020, 4 pages.

Knysh et al., "Adiabatic Quantum Computing in systems with constant inter-qubit couplings", arXiv:quant-ph/0511131, Nov. 15, 2005.

Ben-Tal, et al., "Robust optimization—methodology and applications", Math. Program., Ser. B 92: 453-480 (2002), Digital Object Identifier (DOI) 10.1007/s101070100286.

Karimi, et al., "Boosting quantum annealer performance via sample persistence", arXiv:1606.07797v4 [quant-ph] May 18, 2017, 25 pages.

Lewis, et al., "Probabilistic multistart with path relinking for solving the unconstrained binary quadratic problem", Int. J. Operational Research, vol. 26, No. 1, 2016.

Non Final Office Action for U.S. Appl. No. 17/379,172, mailed Sep. 15, 2022, 11 pages.

SYSTEMS AND METHODS FOR IMPROVING THE PERFORMANCE OF NON-STOQUASTIC QUANTUM DEVICES

FIELD

This disclosure generally relates to quantum computing, and particularly to the operation of quantum devices such as quantum processors.

BACKGROUND

Quantum devices are structures in which quantum mechanical effects are observable, including circuits in which current transport is dominated by quantum mechanical effects such as spintronics and superconducting circuits. Quantum processors use such quantum devices to perform computation using, for example, quantum annealing, gate-model logic, and/or other quantum computing paradigms. Terminology and architectures for quantum processors vary, but generally they comprise qubits coupled by couplers.

Quantum annealing-based quantum processors in particular are capable of representing a Hamiltonian based on a problem by programming their qubits and/or couplers appropriately. Such quantum processors find low-energy states of the Hamiltonian which correspond to solutions (or approximations thereof) of the problem.

In stoquastic quantum annealing-based quantum processors, such as those providing only ZZ couplings between qubits, the Hamiltonian is invariant under spin-flip transformations (also referred to in the present application as gauge transformations). ZZ couplings between qubits are defined in the detail description below. An error-free device should produce solutions with unchanged probability when subjected to a gauge transformation, whereas a device with non-zero error should exhibit different behavior under different gauges. An expectation of gauge-invariance can be used, for example, to calibrate quantum devices based on the observation that differences in behavior under gauge transformation are likely caused by error. Examples of quantum processors, Hamiltonians, and calibration techniques are provided by U.S. patent application Ser. No. 14/829,342 (U.S. Pat. No. 10,552,755 "SYSTEMS AND METHODS FOR IMPROVING THE PERFORMANCE OF A QUANTUM PROCESSOR TO REDUCE INTRINSIC/CONTROL ERRORS"), PCT Application No. US2019/14546 (PCT Publication No. WO2019/144118A1 "SYSTEMS AND METHODS FOR IMPROVING PERFORMANCE OF AN ANALOG PROCESSOR"), and US Provisional Patent Application Nos. 62/777,989 (U.S. patent application Ser. No. 16/702,096 "SYSTEMS AND METHODS FOR REDUCING ERRORS IN CALIBRATED DEVICES") and 62/725,933 (PCT Application No. US2019/047747 "SYSTEMS AND METHODS FOR OPERATION OF A FREQUENCY MULTIPLEXED RESONATOR INPUT AND/OR OUTPUT FOR A SUPERCONDUCTING DEVICE").

Non-stoquastic quantum annealing-based quantum processors having both YY and ZZ couplings have recently been introduced. The resulting Hamiltonian of such quantum processors is gauge-dependent, meaning that a given solution may be produced with different probabilities even in an error-free device. The more complex physics of non-stoquastic quantum annealing-based quantum processors provides both obstacles and opportunities for quantum computation. Examples of non-stoquastic quantum processors are provided by PCT Application No. US2018/066613 ("PCT Publication No. US2019126396A1 SYSTEMS AND METHODS FOR COUPLING QUBITS IN A QUANTUM PROCESSOR").

The foregoing examples of the related art and limitations related thereto are intended to be illustrative and not exclusive. Other limitations of the related art will become apparent to those of skill in the art upon a reading of the specification and a study of the drawings.

BRIEF SUMMARY

There is thus a general desire for systems and methods for improving the performance of non-stoquastic quantum devices, particularly non-stoquastic quantum processors. The present disclosure provides such techniques. Clusters of qubits with correlated behavior are identified in a problem for processing by the quantum processor. Couplings between qubits in the cluster are modified according to a transformation, such as a gauge transformation, so that they evolve slower and thus their dynamics freeze out later, for example by flipping anti-ferromagnetic (AFM) couplings to ferromagnetic (FM) couplings. Couplings between qubits which do not belong to a common cluster may be flipped the other way (for example, from FM to AFM couplings) to accelerate their dynamics. The quantum processor is evolved and the results are modified according to an inverse transformation.

A method for performing a quantum computation with a non-stoquastic quantum processor, the non-stoquastic quantum processor comprising a plurality of qubits coupled by a first plurality of couplers operable to couple qubits in a first basis combination and a second plurality of couplers operable to couple qubits in a second basis combination, the method performed by one or more processors, may be summarized as comprising receiving a representation of a problem for computation by the non-stoquastic quantum processor; identifying a first and a second qubit of the plurality of qubits belonging to a common cluster of qubits, the identifying of the first and the second qubit based on the problem for computation by the non-stoquastic quantum processor, and based on correlations between the first and the second qubit; applying a transformation to a first coupler of the first plurality of couplers based on the common cluster of qubits to generate a modified representation of the problem, the first coupler operable to couple the first and the second qubit in the first basis combination, the first and the second qubit also coupleable in the second basis combination by a second coupler of the second plurality of couplers; causing the non-stoquastic quantum processor to non-stoquastically evolve based on the modified representation of the problem to generate a final state, wherein causing the non-stoquastic quantum processor to non-stoquastically evolve comprises coupling the first and the second qubit in the first and the second basis combination by the first and the second coupler; obtaining a representation of the final state; and applying an inverse of the transformation to the representation of the final state.

In some implementations, identifying a first and a second qubit belonging to a common cluster of qubits comprises predicting that the first and the second qubit are likely to belong to the common cluster of qubits based on a coupling strength of at least one of the first and the second coupler. In some implementations, predicting that the first and the second qubit are likely to belong to the common cluster of qubits comprises performing statistical cluster analysis based on the plurality of qubits and the first and the second plurality of couplers to identify one or more clusters of qubits, the one or more clusters of qubits comprising the common cluster. In some implementations, predicting that the first and the second qubit are likely to belong to the common cluster of qubits comprises causing the non-stoquastic quantum processor to generate a plurality of sample final states and determining, based on representations of each final state of the plurality of sample final states, that a correlation between the first and the second qubit exceeds a threshold. In some implementations, determining that a correlation between the first and the second qubit exceeds a threshold comprises determining that the correlation between the first and the second qubit exceeds a mean of correlations between qubits of the plurality of qubits by at least a predetermined number of standard deviations. In some implementations, causing the non-stoquastic quantum processor to generate a plurality of sample final states comprises causing the non-stoquastic quantum processor to evolve based on a representation of the problem modified to remove at least one coupling in the second basis combination.

In some implementations, applying a transformation to a first coupler comprises applying a gauge transformation to the first coupler. In some implementations, applying a gauge transformation to the first coupler comprises at least attempting to maximize ferromagnetic couplings. In some implementations, at least attempting to maximize ferromagnetic couplings comprises at least attempting to maximize ferromagnetic couplings by the non-stoquastic quantum processor. In some implementations, applying a gauge transformation to the first coupler comprises generating a gauge transformation based at least in part on a solution obtained by programming the non-stoquastic processor with local fields for qubits of the plurality of qubits, and couplings between the qubits of the plurality of qubits, and causing the non-stoquastic processor to evolve.

In some implementations, applying a transformation to a first coupler comprises inverting a sign of a coupling strength of the first coupler.

In some implementations, the first basis combination comprises ZZ couplings and the second basis combination comprises YY couplings, and applying a transformation comprises modifying a coupling strength of the first coupler from antiferromagnetic coupling to ferromagnetic coupling, or vice versa. In some implementations, the ZZ couplings comprise inductive coupling, the YY couplings comprise capacitive coupling, the first coupler comprises an inductance, the second coupler comprises a capacitance, the problem specifies an antiferromagnetic coupling strength for the first coupler and modifying the first coupling comprises assigning a ferromagnetic coupling strength to the first coupler.

In some implementations, the method may be summarized as further comprising determining a third qubit is outside the common cluster of qubits based on the problem and based on correlations between the first and the third qubit; and applying the transformation to a third coupler of at least one of the first and the second plurality of couplers, the third coupler operable to couple the first and the third qubit. In some implementations, the problem specifies a ferromagnetic coupling strength for the third coupler, and applying the transformation to the third coupler comprises assigning an antiferromagnetic coupling strength to the third coupler.

A computing system may be summarized as comprising at least one processor in communication with a non-stoquastic quantum processor; and at least one nontransitory processor-readable medium communicatively coupled to the at least one processor, the at least one nontransitory processor-readable medium storing at least one of processor-executable instructions or data which, when executed by the at least one processor, cause the at least one processor to perform any of the implementations of the method described above.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

Computing Systems

Figure 1:
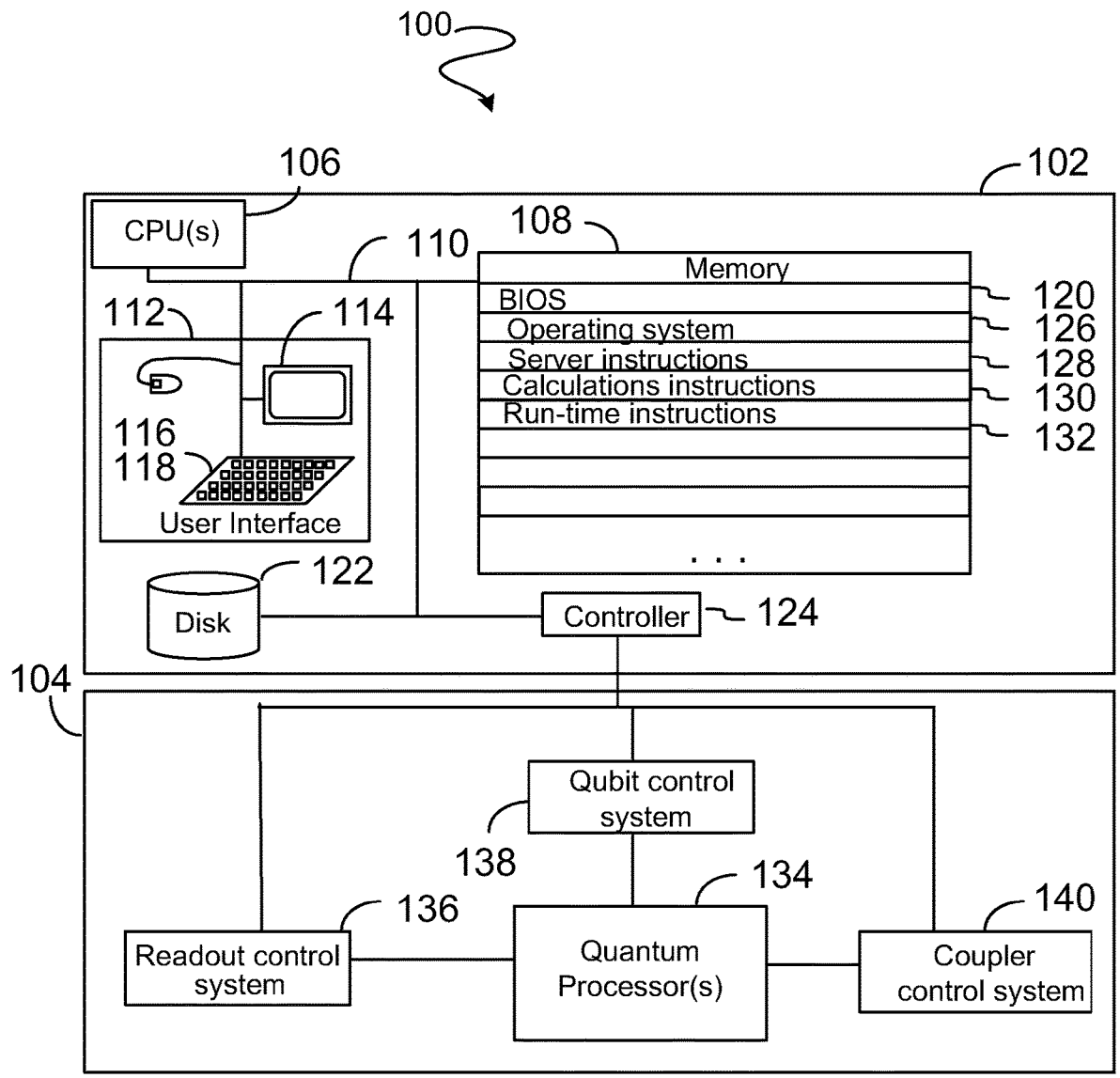
FIG. 1 is a schematic diagram of an example hybrid computing system including a digital computer coupled to an analog computer.

FIG. 1 illustrates a hybrid computing system 100 including a digital computer 102 coupled to an analog computer 104. In some implementations, analog computer 104 is a quantum computer and digital computer 102 is a classical computer.

The exemplary digital computer 102 includes a digital processor (such as one or more central processor units 106) that may be used to perform classical digital processing tasks described in the present systems and methods. Those skilled in the relevant art will appreciate that the present systems and methods can be practiced with other digital computer configurations, including hand-held devices, multiprocessor systems, microprocessor-based or programmable consumer electronics, personal computers ("PCs"), network PCs, mini-computers, mainframe computers, and the like, when property configured or programmed to form special purpose machines, and/or when communicatively coupled to control an analog computer, for instance a quantum computer.

Digital computer 102 will at times be referred to in the singular herein, but this is not intended to limit the application to a single digital computer. The present systems and methods can also be practiced in distributed computing environments, where tasks or sets of instructions are performed or executed by remote processing devices, which are linked through a communications network. In a distributed computing environment computer-readable and/or processor-readable instructions (also referred to in the present application as program modules), application programs and/or data, may be stored in local and/or remote memory storage devices (e.g., non-transitory computer-readable and/or processor-readable media).

Digital computer 102 may include at least one or more digital processors (e.g., one or more central processor units 106), one or more system memories 108, and one or more system buses 110 that couple various system components, including system memory 108 to central processor unit 106.

The digital processor may be any logic processing unit, such as one or more central processing units ("CPUs") with one or more cores, graphics processing units ("GPUs"), digital signal processors ("DSPs"), application-specific integrated circuits ("ASICs"), field-programmable gate arrays ("FPGAs"), programmable logic controllers (PLCs), etc.

Digital computer 102 may include a user input/output subsystem 112. In some implementations, the user input/output subsystem includes one or more user input/output components such as a display 114, mouse 116, and/or keyboard 118. System bus 110 can employ any known bus structures or architectures, including a memory bus with a memory controller, a peripheral bus, and a local bus. System memory 108 may include non-volatile memory, for example one or more of read-only memory ("ROM"), static random-access memory ("SRAM"), Flash NAND; and volatile memory, for example random access memory ("RAM") (not shown), all of which are examples of non-transitory computer-readable and/or processor-readable media.

A basic input/output system ("BIOS") 120, which can form part of the ROM, contains basic routines that help transfer information between elements within digital computer 102, such as during startup of hybrid computing system 100.

Digital computer 102 may also include other non-volatile memory 122. Non-volatile memory 122 may take a variety of forms, including: a hard disk drive for reading from and writing to a hard disk, an optical disk drive for reading from and writing to removable optical disks, and/or a magnetic disk drive for reading from and writing to magnetic disks, all of which are examples of non-transitory computer- or processor-readable media. The optical disk can be a CD-ROM or DVD, while the magnetic disk can be a magnetic floppy disk or diskette. Non-volatile memory 122 may communicate with digital processor via system bus 110 and may include appropriate interfaces or controllers 124 coupled to system bus 110. Non-volatile memory 122 may serve as non-transitory long-term storage for computer-readable and/or processor-readable instructions, data structures, or other data (also referred to in the present application as program modules) for digital computer 102.

Although digital computer 102 has been described as employing hard disks, optical disks and/or magnetic disks, those skilled in the relevant art will appreciate that other types of non-volatile computer-readable media may be employed, such magnetic cassettes, flash memory cards, Flash, ROMs, smart cards, etc., all of which are further examples of non-transitory computer- or processor-readable media. Those skilled in the relevant art will appreciate that some computer architectures conflate volatile memory and non-volatile memory. For example, data in volatile memory can be cached to non-volatile memory, or a solid-state disk that employs integrated circuits to provide non-volatile memory. Some computers place data traditionally stored on disk in memory. As well, some media that are traditionally regarded as volatile can have a non-volatile form, e.g., Non-Volatile Dual In-line Memory Module variation of Dual In-Line Memory Modules.

Various sets of computer-readable and/or processor-readable instructions (also called program modules), application programs and/or data can be stored in system memory 108. For example, system memory 108 may store an operating system 126, server instructions 128, calculations instructions 130, and/or run-time instructions 132.

While shown in FIG. 1 as being stored in system memory 108, the program modules and other data can be stored elsewhere including in non-volatile memory 122 or in one or more other non-transitory computer-readable and/or processor-readable media.

Analog computer 104 can be provided in an isolated environment (not shown). For example, where analog computer 104 is a quantum computer, the environment shields internal elements of the quantum computer from heat, external magnetic field, and the like. Analog computer 104 includes one or more analog processors such as quantum processor(s) 134.

A quantum processor includes programmable elements such as qubits, couplers, and other devices. In one implementation, the qubits are superconducting flux qubits. The qubits are read out via readout system 136. These results can be fed to the various sets of computer-readable and/or processor-readable instructions for digital computer 102. Analog computer 104 can include a qubit control system 138 and a coupler control system 140. Coupler control system 140 can provide control of communicative coupling between qubits such as inductive and capacitive communicative coupling described in the present application.

In some embodiments, hybrid computer 100 is used to implement quantum annealing on quantum processor 134.

In some implementations, digital computer 102 can operate in a networked environment using logical connections to at least one client computer system. In some implementations, digital computer 102 is coupled via logical connections to at least one database system. These logical connections may be formed using any means of digital communication, for example, through a network, such as a local area network ("LAN") or a wide area network ("WAN") including, for example, the Internet. The networked environment may include wired or wireless enterprise-wide computer networks, intranets, extranets, and/or the Internet. Other embodiments may include other types of communication networks such as telecommunications networks, cellular networks, paging networks, and other mobile networks. The information sent or received via the logical connections may or may not be encrypted. When used in a LAN networking environment, digital computer 102 may be connected to the LAN through an adapter or network interface card ("NIC") (communicatively linked to system bus 110). When used in a WAN networked environment, digital computer 102 may include an interface and modem (not shown), or a device such as NIC, for establishing communications over the WAN. Non-networked communications may additionally, or alternatively, be employed.

In accordance with some embodiments of the present systems and devices, a quantum processor (for example, quantum processor 134 of FIG. 1) may be designed to perform quantum annealing and/or adiabatic quantum computation. An evolution Hamiltonian is constructed, which is proportional to the sum of a first term proportional to a problem Hamiltonian and a second term proportional to a delocalization Hamiltonian, as follows:

$$H_E \propto A(t)H_P + B(t)H_D$$

where $H_E$ is the evolution Hamiltonian, $H_P$ is the problem Hamiltonian, $H_D$ is the delocalization Hamiltonian, and A(t), B(t) are coefficients that can control the rate of evolution, and typically lie in the range [0,1].

In some implementations, a time-varying envelope function is placed on the problem Hamiltonian. A suitable delocalization Hamiltonian is given by:

$$H_D \propto -\frac{1}{2}\sum_{i=1}^{N} \Delta_i \sigma_i^x$$

where N represents the number of qubits, $\sigma_i^x$ is the Pauli x-matrix for the $i^{th}$ qubit and $\Delta_i$ is the single-qubit tunnel-splitting induced in the $i^{th}$ qubit. Here, the $\sigma_i^x$ terms are examples of "off-diagonal" terms.

A common problem Hamiltonian includes a first component proportional to diagonal single-qubit terms, and a second component proportional to diagonal multi-qubit terms, and may be of the following form:

$$H_P \propto -\frac{\varepsilon}{2}\left[\sum_{i=1}^{N} h_i \sigma_i^z + \sum_{j>i}^{N} J_{ij}\sigma_i^z \sigma_j^z\right]$$

where N represents the number of qubits, $\sigma_i^z$ is the Pauli z-matrix for the $i^{th}$ qubit, $h_i$ and $J_{ij}$ are dimensionless local fields for the qubits, and couplings between qubits, respectively, and $\varepsilon$ is a characteristic energy scale for $H_P$.

The $\sigma_i^z$ and $\sigma_i^z\sigma_j^z$ terms are examples of "diagonal" terms. The former is a single-qubit term and the latter a two-qubit term.

Throughout this specification, the terms "problem Hamiltonian" and "final Hamiltonian" are used interchangeably unless the context dictates otherwise. Certain states of the quantum processor are energetically preferred, or simply preferred by the problem Hamiltonian. These include ground states but may include excited states.

Hamiltonians such as $H_D$ and $H_P$ in the above two equations, respectively, may be physically realized in a variety of different ways. A particular example is realized by an implementation of superconducting qubits.

Examples of superconducting qubits include superconducting flux qubits, superconducting charge qubits, and the like. In a superconducting flux qubit, the Josephson energy dominates or is equal to the charging energy. In a charge qubit it is the reverse. Examples of flux qubits that may be used include RF-SQUIDs, which include a superconducting loop interrupted by a Josephson junction, persistent current qubits, which include a superconducting loop interrupted by three Josephson junctions, and the like. See, examples of RF-SQUID qubits in Bocko, et al., 1997, IEEE Trans. on Appl. Supercond. 7, 3638; Friedman, et al., 2000, Nature 406,43; and Harris, et al., 2010, Phys. Rev. B 81, 134510; or persistent current qubits, Mooij et al., 1999, Science 285, 1036; and Orlando et al., 1999, Phys. Rev. B 60, 15398. In addition, hybrid charge-phase qubits, where the energies are equal, may also be used.

Further details of superconducting qubits may be found in Makhlin, et al., 2001, Rev. Mod. Phys. 73, 357; Devoret et al., 2004, arXiv:cond-mat/0411174; Zagoskin and Blais, 2007, Physics in Canada 63, 215; Clarke and Wilhelm, 2008, Nature 453, 1031; Martinis, 2009, Quantum Inf. Process. 8, 81; and Devoret and Schoelkopf, 2013, Science 339, 1169.

In some embodiments, the qubits and couplers are controlled by on chip circuitry. Examples of on-chip control circuitry can be found in U.S. Pat. No. 7,876,248 "SYSTEMS, METHODS AND APPARATUS FOR PROGRAMMING QUANTUM PROCESSOR ELEMENTS"; U.S. Pat. No. 7,843,209 "ARCHITECTURE FOR LOCAL PROGRAMMING OF QUANTUM PROCESSOR ELEMENTS USING LATCHING QUBITS"; U.S. Pat. No. 8,018,244 "ADIABATIC SUPERCONDUCTING QUBIT LOGIC DEVICES AND METHODS"; U.S. Pat. No. 8,098,179 "SYSTEMS, METHODS AND APPARATUS FOR DIGITAL-TO-ANALOG CONVERSION OF SUPERCONDUCTING MAGNETIC FLUX SIGNALS"; U.S. Pat. No. 8,169,231 "SYSTEMS, METHODS, AND APPARATUS FOR QUBIT STATE READOUT"; and U.S. Pat. No. 8,786,476 "SYSTEMS, METHODS AND APPARATUS FOR DIGITAL-TO-ANALOG CONVERSION OF SUPERCONDUCTING MAGNETIC FLUX SIGNALS". Further details and implementations of exemplary quantum processors that may be used in conjunction with the present systems and devices are described in, for example, U.S. Pat. No. 7,533,068 "ANALOG PROCESSOR COMPRISING QUANTUM DEVICES"; U.S. Pat. No. 8,008,942 "ANALOG PROCESSOR COMPRISING QUANTUM DEVICES"; U.S. Pat. No. 8,195,596 "SYSTEMS, DEVICES AND METHODS FOR INTERCONNECTED PROCESSOR TOPOLOGY"; U.S. Pat. No. 8,190,548 "SYSTEMS, DEVICES AND METHODS FOR ANALOG PROCESSING"; and U.S. Pat. No. 8,421,053 "SYSTEMS, DEVICES AND METHODS FOR ANALOG PROCESSING".

Non-Stoauastic Quantum Processors

A Hamiltonian is referred to in the present application as a "stoquastic" Hamiltonian if it is given by a real Hermitian matrix in which all off-diagonal elements of the matrix are non-positive in the standard basis. Otherwise, the Hamiltonian is referred to as a "non-stoquastic" Hamiltonian. Hormozi et. al. In "NONSTOQUASTIC HAMILTONIANS AND QUANTUM ANNEALING OF AN ISING SPIN GLASS" (arxiv.org/pdf/1609.06558, May 2017) describe the role of Hamiltonian complexity in the performance of a quantum annealer.

A signature of a system with a non-stoquastic Hamiltonian is that the system can exhibit destructive interference between tunneling paths that cannot be efficiently simulated by a stochastic method. Interference can occur when two waves meet. Destructive interference can occur when one wave has a displacement in an opposite direction to the other wave. Destructive interference between tunneling paths can result in a lower tunneling amplitude.

A quantum system with a non-stoquastic Hamiltonian cannot be efficiently simulated by a Quantum Monte-Carlo (QMC) method—the most advanced classical simulation method. QMC methods are described further, for example, in R. R. dos Santos, "Introduction to Quantum Monte Carlo Simulations for Fermionic Systems", arXiv:cond-mat/0303551 [cond-mat.str-el] (2003). There is evidence that a non-stoquastic Hamiltonian can improve the efficiency of quantum annealing.

Figure 2:
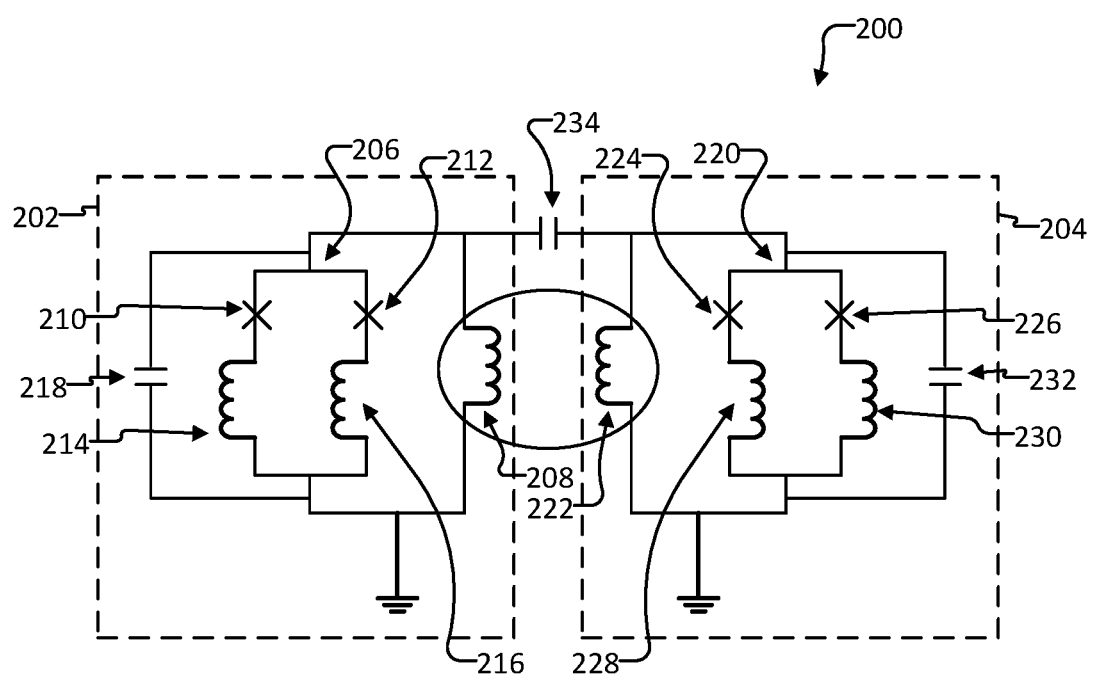
FIG. 2 is a schematic diagram of an example implementation of a portion of a superconducting quantum processor which provides YY and ZZ couplings via capacitive and inductive couplings.

In some implementations, quantum processor 134 provides coupling in multiple bases, for example by providing couplings in the $\sigma_x$ basis (referred to in the present application as XX couplings), the $\sigma_y$ basis (referred to in the present application as YY couplings), the $\sigma_z$ basis (referred to in the present application as ZZ couplings), and/or couplings between bases (e.g. XY, XZ, and/or YZ couplings). Certain configurations of such multi-basis couplings can provide non-stoquastic effects, such as YY and ZZ couplings. FIG. 2 is a schematic diagram of an example implementation of a portion 200 of a superconducting quantum processor which provides YY and ZZ couplings via capacitive and inductive couplings, respectively, and thereby is capable of achieving non-stoquastic effects.

Portion 200 of the superconducting quantum processor comprises qubits 202 and 204 (each indicated via respective broken line rectangles enclosing qubits 202 and 204). In one implementation, qubit 202 and/or qubit 204 is a superconducting flux qubit. In another implementation, qubits 202 and 204 are charge qubits or hybrid charge-phase qubits or another suitable type of qubits.

Qubit 202 comprises a compound Josephson Junction (CJJ) 206 and an inductance 208. CJJ 206 comprises Josephson Junctions 210 and 212, inductances 214 and 216, and a capacitance 218. In some implementations, capacitance 218 is an intrinsic capacitance of CJJ 206. Qubit 204 comprises a compound Josephson Junction (CJJ) 220 and an inductance 222. CJJ 220 comprises Josephson Junctions 224 and 226, inductances 228 and 230, and a capacitance 232. In some implementations, capacitance 232 is an intrinsic capacitance of CJJ 220.

Qubits 202 and 204 can be magnetically (inductively) communicatively coupled via a mutual inductance arising from proximity of inductance 208 of qubit 202 to inductance 222 of qubit 204. In one implementation, an inductive communicative coupling of qubits 202 and 204 can be performed using a coupling device, for example, a tunable coupling device (also referred to in the present application as a tunable coupler). In one implementation, an inductive communicative coupling of qubits 202 and 204 is tunable, and the coupling strength can be tuned, for example via an interface (not shown in FIG. 2).

Portion 200 of the superconducting quantum processor comprises a coupling capacitance 234. Qubits 202 and 204 can be capacitively communicatively coupled via coupling capacitance 234.

In one implementation, coupling capacitance 234 of FIG. 2 has a value of approximately 200 F which can be much larger than a total capacitance of a single qubit. For example, a total capacitance of qubit 202 can be determined at least in part from a value of capacitance 218. Similarly, a total capacitance of qubit 204 can be determined at least in part from a value of capacitance 232. When coupling capacitance 234 is much larger than both qubit 202's total capacitance and, separately, qubit 204's total capacitance, a loaded capacitance approaches a value of the sum of capacitances of qubits 202 and 204. In this regime, a coupling energy $J_y$ may not have a strong dependence on the total capacitance of a single qubit such as qubit 202 or qubit 204.

Improving Performance of Non-Stoquastic Quantum Processors

A YY coupling in the Hamiltonian can behave differently for ferromagnetic (FM) and antiferromagnetic (AFM) coupling. In at least some non-stoquastic quantum processors having YY and ZZ couplings, two-qubit tunneling amplitude tends to be smaller for AFM ZZ couplings than for FM ZZ couplings owing to destructive interference caused by the YY coupling. A gauge transformation on ZZ couplers can turn some of the FM couplings into AFM couplings and vice versa, thereby modifying the tunneling properties of the quantum processor (and thus modifying the results of an evolution). Other coupling bases may provide non-stoquastic properties by this or other means.

In some circumstances, quantum annealing processors can encounter asymmetric freezeout (also referred to in the present application as inhomogeneous freezeout)—that is, different qubits' dynamics freeze (i.e., stop evolving) at different points during an evolution. The qubits that freeze early can bias the rest of the qubits, which, depending on the frozen qubits, can have a tendency to move the system away from a global minimum and which can be undesirable. If all qubits can be caused to freeze at the same point of evolution, all exponentially small gaps due to first-order phase transitions may be removed. Finding a condition in which all qubits freeze at the same point can be by itself an NP-hard problem.

In some implementations, hybrid computer 100 applies transformations, such as gauge transformations, to quantum processor 134 to improve the performance of the quantum processor 134. For example, hybrid computer 100 may modify annealing dynamics of the quantum processor by applying gauge transformations to quantum devices to advance or delay the dynamics of the quantum devices relative to other qubits.

Qubits can tend to freeze earlier relative to other qubits when the qubits form clusters with synchronized dynamics (e.g., clusters of qubits which flip together). Such clusters tend to form when qubits within the cluster are coupled more strongly to each other than to qubits outside the cluster and/or when the particular problem represented by the quantum processor has no or limited frustration in the region of the cluster.

In some implementations, given two qubits which are both YY-coupled and ZZ-coupled (e.g., capacitively-coupled and inductively-coupled, respectively, such as shown in FIG. 2 between qubits 202 and 204) and which belong to a cluster, the dynamics of those qubits in the cluster can be modified by assigning an FM ZZ coupling between those qubits. This can tend to push the freeze-out of the qubits in the cluster to later in the evolution than if unmodified. Conversely, the relative dynamics of the qubits in the cluster and qubits outside the cluster can be modified by assigning AFM ZZ coupling between in-cluster and out-of-cluster qubits. Determining which qubits form clusters can be done in various ways (e.g., by cluster analysis), and may be done heuristically, as described in greater detail below.

Figure 3:
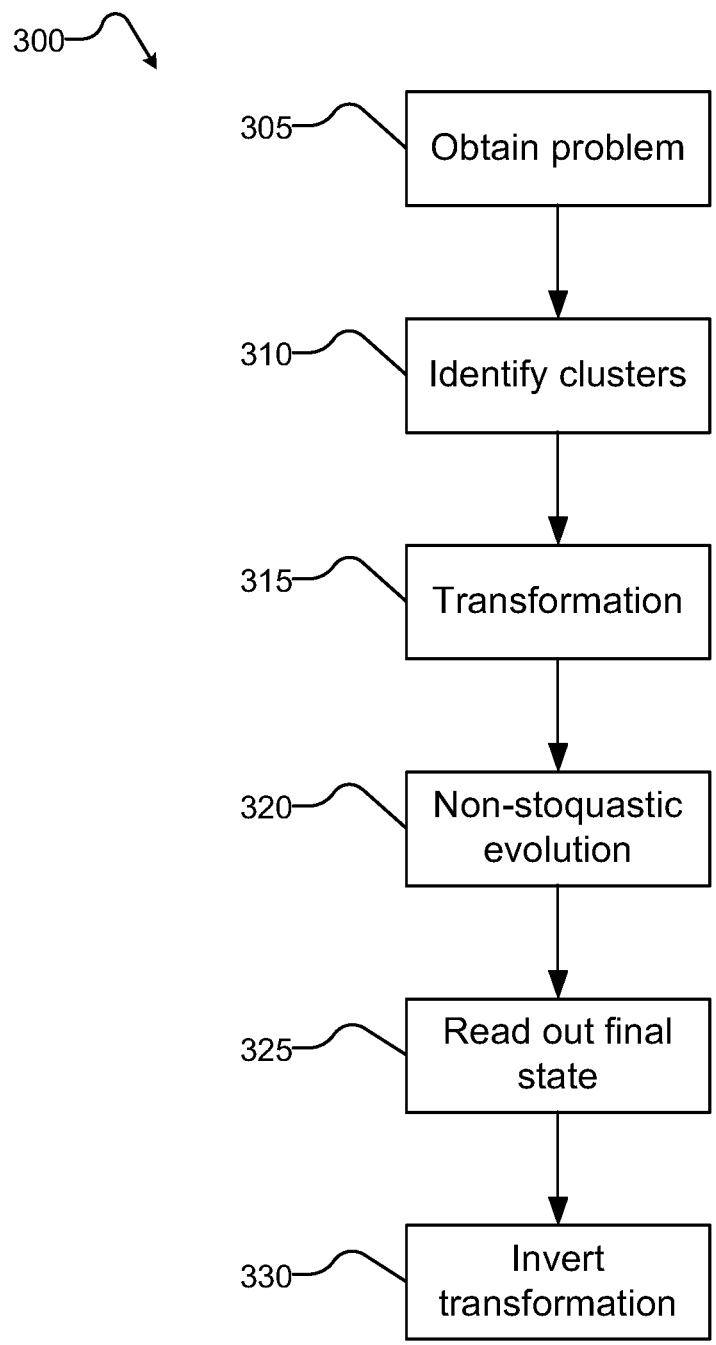
FIG. 3 is a flowchart of an example method 300 for performing a quantum computation with a non-stoquastic quantum processor.

FIG. 3 is a flowchart of an example method 300 for performing a quantum computation with a non-stoquastic quantum processor. At 305, hybrid computer 100 obtains a problem for computation (at least in part) by quantum processor 134. The problem may be received from a user, transmitted over a network, generated by hybrid computer 100, and/or otherwise obtained.

At 310, hybrid computer 100 (and/or another computer) identifies one or more clusters of qubits associated with the problem. Such identification is not necessarily exact; for example, it may comprise heuristic methods, estimation, and/or approximation. In some implementations, identifying clusters involves predicting which qubits are likely to be clustered based on pairwise interactions, such as the strengths of coupling between qubits. For example, strongly-coupled chains of qubits, also referred to in the present application as logical qubits, may be inferred to be clusters based on an embedding of the problem for quantum processor 134. In some implementations, statistical cluster analysis techniques are used to identify clusters based on the respective coupling strengths of the qubits.

In some implementations, identifying clusters involves estimating a likelihood that pairs of qubits are clustered. For example, qubits having stronger couplings between them relative to other qubits may be assessed to have a higher likelihood of forming a cluster. As another example, a machine learning model may be trained over a database of samples, and associated known clusters to generate predictions of whether pairs of qubits belong to the same cluster. It may not be necessary for the cluster as a whole to be explicitly identified. Identifying pairwise likelihoods of common cluster membership for qubits can be sufficient for determining whether the qubits and/or couplers coupling them should be subjected to a transformation (for example, a gauge transformation).

In some implementations, identifying clusters involves generating samples by quantum processor 134 based on the problem and analyzing the samples for clusters of qubits. For example, clusters may be identified based on statistical cluster analysis techniques as described above. Qubits which are strongly correlated or strongly anti-correlated may be assigned a higher estimated likelihood of belonging to a common cluster. The phrases "strongly correlated" and "strongly anti-correlated" in this context may mean, for example, that the magnitude of correlation and anti-correlation, respectively, exceeds a threshold. The threshold may be a suitable constant value, a value which exceeds the mean (e.g., of pairwise correlation coefficients arising from the population of samples) by at least some number of standard deviations, and/or another suitable value.

In some implementations, samples are alternatively or additionally obtained by classical means, e.g., by performing parallel tempering on the problem (by hybrid computer 100 and/or another computer) to produce a population of samples.

Samples from quantum processor 134 and/or other sources may be obtained based on all coupling bases being active or based on a strict subset of coupling bases. For example, a problem having both ZZ and YY couplings may be sampled as-is (subject, in some implementations, to one or more transformations) by quantum processor 134, and/or by classical means such as central processor unit 106, or the problem may be sampled with some or all of the YY couplings inactive (e.g. with only ZZ couplings active, thus ignoring the YY couplings). This can reduce a complexity of drawing samples while still providing a reasonable heuristic of likely cluster relations in at least some circumstances.

At 315, hybrid computer 100 (and/or another computer) determines a transformation to apply to at least one quantum device of quantum processor 134 based on clusters identified at 310. The transformation may comprise a gauge transformation. For example, this may involve applying a gauge transformation which assigns FM ZZ couplings between qubits that have a high (e.g., above a threshold) likelihood of belonging to a common cluster. The gauge transformation may also, or alternatively, assign AFM ZZ couplings between qubits that do not meet this criterion (e.g., qubits with weakly-correlated dynamics). In some implementations, the gauge transformation may be limited to pairs of qubits that are coupled in at least two bases, such as ZZ and YY. Qubits coupled in only one basis (e.g., ZZ) may not be transformed even if they belong to a cluster.

Transformations are not limited to gauge transformations in the ZZ basis. In implementations that support it, couplings in the YY basis and/or other bases may be subject to gauge transformations. In at least some implementations, however, couplings are non-invertible, and so the gauge transformation is performed in another basis which experiences destructive interference with the non-invertible basis. For example, in implementations where coupling capacitance 234 of FIG. 2 is operable only in a positive regime (that is, where it cannot be inverted to a negative capacitance), a gauge transformation may be applied to the mutual inductance formed by inductances 208 and 222.

In some implementations, method 300 is repeated for different transformations. For example, different gauge transformations may be generated at 315 by applying different threshold values when determining a likelihood that a pair of qubits belong to a common cluster and/or by otherwise applying different techniques for determining said likelihood. Method 300 may be performed some number of times with gauge transformations and some other number of times with non-gauge transformations.

At 320, hybrid computer 100 causes quantum processor 134 to evolve a representation of the problem, as modified by the transformation. The quantum processor produces a result, e.g., as described above, which is received by hybrid computer 100 at 325 during a read-out phase. Acts 320 and 325 may be repeated a suitable number of times for a given combination of problem and gauge transformations. For example, a problem modified by a transformation may be evolved a number of times so as to produce a population of samples for analysis.

At 330, hybrid computer 100 and/or another computer inverts the transformation, e.g., by applying a gauge transformation to the results returned by quantum processor 134, since gauge transformations are self-invertible. Post-processing of results may occur before and/or after applying the inverting transformation. The output is a sample which corresponds to the original problem rather than the gauge transformation-modified problem.

Although the results returned by the quantum processor 134 from executing the method 300 are in principle obtainable without applying gauge transformations, the annealing path followed by quantum processor 134 is modified by the gauge transformation and thus the distribution of results received is likely to be different in practice. In certain circumstances, method 300 may enable quantum processor 134 to advantageously explore certain regions of state space more effectively, thereby improving an overall performance of quantum processor 134 (and thus hybrid computer 100). In some implementations, hybrid computer 100 causes quantum processor 134 to sample from representations of the problem with and without the selected gauge transformation(s), thereby potentially diversifying the population of samples obtained.

Transformations other than gauge transformations may be employed. For example, an invertible transformation under which the energy of the problem Hamiltonian is invariant may be used. The precise form of this transformation may vary between problems. Gauge transformations are often convenient since they are a) invariant for broad classes of Hamiltonian (e.g., gauge transformations may be invertible for problems computable by a particular quantum processing architecture), b) computationally efficient, and c) self-invertible. For example, in some implementations having YY and/or XX couplings, the transformation comprises changing the sign of one or more YY and/or XX terms, respectively (i.e., inverting YY and/or XX couplings). This approach, in at least some circumstances, works for XX couplings, and tends to provide similar effects to the gauge transformations on YY couplings described above. In both XX and YY cases, one sign (e.g., positive) can tend to increase two-qubit tunneling amplitude and the opposite sign (e.g., negative) can tend to decrease it. Thus, in some implementations, the transformation comprises transforming XX and/or YY couplings between two qubits to adopt the sign that increases the two-qubit tunneling amplitude if those two qubits are correlated (e.g., belong to a common cluster) and, optionally, adopting the opposite sign otherwise. Sign-tunable coupling can be harder to implement in some hardware designs, but may be more readily applicable to XX coupling than gauge transformations.

Hormozi et. al. "Non-Stoquastic Hamiltonians and Quantum Annealing of Ising Spin Glass", arXiv:1609.06558v2 [quant-ph] describes results of a study of quantum annealing with non-stoquastic Hamiltonians, and their performance in solving optimization problems. The study was directed to XX couplings, and used an intermediate Hamiltonian with a randomly chosen mix of ferromagnetic and anti-ferromagnetic couplings. The XX terms in the problem Hamiltonian are gauge-invariant. Unlike Hormozi et. al., the systems and methods described in the present application are particularly suited to terms in the problem Hamiltonian that are gauge-variant. In one implementation, a suitable gauge transformation can be found by at least attempting to minimize the following expression:

$$\sum_{i,j} J_{ij}\alpha_i\alpha_j$$

and using $\alpha_i$ as a gauge transformation. The implementation is at least similar to maximizing ferromagnetic couplings, for example. The above expression is similar to the problem Hamiltonian with the $h_i$ terms (local fields for the qubits) removed (i.e., set to zero). Minimization of the above expression can be optimal or sub-optimal. For example, simulated annealing, or another suitable optimization approach, can be used to provide a suitable gauge transformation.

In some implementations, a quantum processor (e.g., quantum processor 134 of FIG. 1) can be used to find a suitable gauge transformation, for example by at least attempting to minimize the above expression. In one implementation, a quantum processor can be run initially with the $h_i$ terms set to zero to generate a solution that can be used as a gauge transformation for a subsequent run.

In some implementations, $h_i$ terms can be included in the above expression (i.e., set to non-zero values), which becomes at least similar to the problem Hamiltonian, for example as follows:

$$\sum_i h_i\alpha_i + \sum_{i,j} J_{ij}\alpha_i\alpha_j$$

Attempting to minimize the above expression, and selecting a gauge transformation based at least in part on a solution to use with the systems and methods described above, can improve performance of a non-stoquastic quantum processor. In some implementations, the approach can be Iterated, for example by using the result obtained using a first gauge transformation as a basis for a second gauge transformation.

The above described method(s), process(es), or technique(s) could be implemented by a series of processor readable instructions stored on one or more nontransitory processor-readable media. Some examples of the above described method(s), process(es), or technique(s) method are performed in part by a specialized device such as an adiabatic quantum computer or a quantum annealer or a system to program or otherwise control operation of an adiabatic quantum computer or a quantum annealer, for instance a computer that includes at least one digital processor. The above described method(s), process(es), or technique(s) may include various acts, though those of skill in the art will appreciate that in alternative examples certain acts may be omitted and/or additional acts may be added. Those of skill in the art will appreciate that the illustrated order of the acts is shown for exemplary purposes only and may change in alternative examples. Some of the exemplary acts or operations of the above described method(s), process(es), or technique(s) are performed Iteratively. Some acts of the above described method(s), process(es), or technique(s) can be performed during each iteration, after a plurality of iterations, or at the end of all the Iterations.

The above description of illustrated implementations, including what is described in the Abstract, is not intended to be exhaustive or to limit the implementations to the precise forms disclosed. Although specific implementations of and examples are described herein for illustrative purposes, various equivalent modifications can be made without departing from the spirit and scope of the disclosure, as will be recognized by those skilled in the relevant art. The teachings provided herein of the various implementations can be applied to other methods of quantum computation, not necessarily the exemplary methods for quantum computation generally described above.

The various implementations described above can be combined to provide further implementations. All of the commonly assigned US patent application publications, US patent applications, foreign patents, and foreign patent applications referred to in this specification and/or listed in the Application Data Sheet are incorporated herein by reference, in their entirety, including but not limited to U.S. patent application Ser. No. 14/829,342 (U.S. Pat. No. 10,552,755 "SYSTEMS AND METHODS FOR IMPROVING THE PERFORMANCE OF A QUANTUM PROCESSOR TO REDUCE INTRINSIC/CONTROL ERRORS"), PCT Application No. US2019/14546 (PCT Publication No. WO2019/144118A1 "SYSTEMS AND METHODS FOR IMPROV- ING PERFORMANCE OF AN ANALOG PROCESSOR"), U.S. Provisional Patent Application No. 62/777,989 (U.S. patent application Ser. No. 16/702,096 "SYSTEMS AND METHODS FOR REDUCING ERRORS IN CALIBRATED DEVICES"), U.S. Provisional Patent Application No. 62/725,933, (PCT Application No. US2019/047747 "SYSTEMS AND METHODS FOR OPERATION OF A FREQUENCY MULTIPLEXED RESONATOR INPUT AND/OR OUTPUT FOR A SUPERCONDUCTING DEVICE"), PCT Application No. US2018/066613 (PCT Publication No. US2019126396A1 "SYSTEMS AND METHODS FOR COUPLING QUBITS IN A QUANTUM PROCESSOR"), and U.S. Provisional Patent Application No. 62/832,117 "SYSTEMS AND METHODS FOR IMPROVING THE PERFORMANCE OF NON-STOQUASTIC QUANTUM DEVICES."

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A method for performing a quantum computation with a non-stoquastic quantum processor, the non-stoquastic quantum processor comprising a plurality of qubits coupled by a first plurality of couplers operable to couple qubits in a first basis combination and a second plurality of couplers operable to couple qubits in a second basis combination, the method performed by one or more processors and comprising:
receiving a representation of a problem for computation by the non-stoquastic quantum processor;
identifying a first and a second qubit of the plurality of qubits belonging to a common cluster of qubits, the identifying of the first and the second qubit based on the problem for computation by the non-stoquastic quantum processor, and based on correlations between the first and the second qubit;
applying a transformation to a first coupler of the first plurality of couplers based on the common cluster of qubits to generate a modified representation of the problem, the first coupler operable to couple the first and the second qubit in the first basis combination, the first and the second qubit also coupleable in the second basis combination by a second coupler of the second plurality of couplers;
causing the non-stoquastic quantum processor to non-stoquastically evolve based on the modified representation of the problem to generate a final state, wherein causing the non-stoquastic quantum processor to non-stoquastically evolve comprises coupling the first and the second qubit in the first and the second basis combination by the first and the second coupler;
obtaining a representation of the final state; and
applying an inverse of the transformation to the representation of the final state.

2. The method according to claim 1 wherein identifying a first and a second qubit belonging to a common cluster of qubits comprises predicting that the first and the second qubit are likely to belong to the common cluster of qubits based on a coupling strength of at least one of the first and the second coupler.

3. The method according to claim 2 wherein predicting that the first and the second qubit are likely to belong to the common cluster of qubits comprises performing statistical cluster analysis based on the plurality of qubits and the first and the second plurality of couplers to identify one or more clusters of qubits, the one or more clusters of qubits comprising the common cluster of qubits.

4. The method according to claim 2 wherein predicting that the first and the second qubit are likely to belong to the common cluster of qubits comprises causing the non-stoquastic quantum processor to generate a plurality of sample final states and determining, based on representations of each final state of the plurality of sample final states, that a correlation between the first and the second qubit exceeds a threshold.

5. The method according to claim 4 wherein determining that a correlation between the first and the second qubit exceeds a threshold comprises determining that the correlation between the first and the second qubit exceeds a mean of correlations between qubits of the plurality of qubits by at least a predetermined number of standard deviations.

6. The method according to claim 4 wherein causing the non-stoquastic quantum processor to generate a plurality of sample final states comprises causing the non-stoquastic quantum processor to evolve based on a representation of the problem modified to remove at least one coupling in the second basis combination.

7. The method according to claim 1 wherein applying a transformation to a first coupler comprises applying a gauge transformation to the first coupler.

8. The method according to claim 7 wherein applying a gauge transformation to the first coupler comprises at least attempting to maximize ferromagnetic couplings.

9. The method according to claim 8 wherein at least attempting to maximize ferromagnetic couplings comprises at least attempting to maximize ferromagnetic couplings by the non-stoquastic quantum processor.

10. The method according to claim 8 wherein applying a gauge transformation to the first coupler comprises generating a gauge transformation based at least in part on a solution obtained by programming the non-stoquastic quantum processor with local fields for qubits of the plurality of qubits, and couplings between the qubits of the plurality of qubits, and causing the non-stoquastic quantum processor to evolve.

11. The method according to claim 1 wherein applying a transformation to a first coupler comprises inverting a sign of a coupling strength of the first coupler.

12. The method according to claim 1 wherein the first basis combination comprises ZZ couplings and the second basis combination comprises YY couplings, and applying a transformation comprises modifying a coupling strength of the first coupler from antiferromagnetic coupling to ferromagnetic coupling, or vice versa.

13. The method according to claim 12 wherein the ZZ couplings comprise inductive coupling, the YY couplings comprise capacitive coupling, the first coupler comprises an inductance, the second coupler comprises a capacitance, the problem specifies an antiferromagnetic coupling strength for the first coupler and modifying a coupling strength of the first coupler comprises assigning a ferromagnetic coupling strength to the first coupler.

14. The method according to claim 1 further comprising:
determining a third qubit is outside the common cluster of qubits based on the problem and based on correlations between the first and the third qubit; and applying the transformation to a third coupler of at least one of the first and the second plurality of couplers, the third coupler operable to couple the first and the third qubit.

15. The method according to claim 14 wherein the problem specifies a ferromagnetic coupling strength for the third coupler, and applying the transformation to the third coupler comprises assigning an antiferromagnetic coupling strength to the third coupler.

16. A computing system comprising:
at least one processor in communication with a non-stoquastic quantum processor, the non-stoquastic quantum processor comprising a plurality of qubits coupled by a first plurality of couplers operable to couple qubits in a first basis combination and a second plurality of couplers operable to couple qubits in a second basis combination; and
at least one nontransitory processor-readable medium communicatively coupled to the at least one processor, the at least one nontransitory processor-readable medium storing at least one of processor-executable instructions or data which, when executed by the at least one processor, cause the at least one processor;
receive a representation of a problem for computation by the non-stoquastic quantum processor;
identify a first and a second qubit of the plurality of qubits belonging to a common cluster of qubits, the identifying of the first and the second qubit based on the problem for computation by the non-stoquastic quantum processor, and based on correlations between the first and the second qubit;
apply a transformation to a first coupler of the first plurality of couplers based on the common cluster of qubits to generate a modified representation of the problem, the first coupler operable to couple the first and the second qubit in the first basis combination, the first and the second qubit also coupleable in the second basis combination by a second coupler of the second plurality of couplers;
cause the non-stoquastic quantum processor to non-stoquastically evolve based on the modified representation of the problem to generate a final state, wherein causing the non-stoquastic quantum processor to non-stoquastically evolve comprises coupling the first and the second qubit in the first and the second basis combination by the first and the second coupler;
obtain a representation of the final state; and
apply an inverse of the transformation to the representation of the final state.

17. The computing system according to claim 16 wherein the at least one processor identifies a first and a second qubit belonging to a common cluster of qubits based on a coupling strength of at least one of the first and the second coupler.

18. The computing system according to claim 16 wherein the first basis combination comprises ZZ couplings and the second basis combination comprises YY couplings, and the transformation comprises modifying a coupling strength of the first coupler from antiferromagnetic coupling to ferromagnetic coupling, or vice versa.

19. The computing system according to claim 18 wherein the ZZ couplings comprise inductive coupling, the YY couplings comprise capacitive coupling, the first coupler comprises an inductance, the second coupler comprises a capacitance, the problem specifies an antiferromagnetic coupling strength for the first coupler and modifying a coupling strength of the first coupler comprises assigning a ferromagnetic coupling strength to the first coupler.

20. The computing system according to claim 16 wherein the at least one processor further:
determines a third qubit is outside the common cluster of qubits based on the problem and based on correlations between the first and the third qubit; and
applies the transformation to a third coupler of at least one of the first and the second plurality of couplers, the third coupler operable to couple the first and the third qubit.

* * * * *